(12) United States Patent
Matthews et al.

(10) Patent No.: US 8,719,727 B2
(45) Date of Patent: May 6, 2014

(54) MANAGING AN IMMERSIVE ENVIRONMENT

(75) Inventors: David A. Matthews, Seattle, WA (US); Jesse Clay Satterfield, Seattle, WA (US); Stephan Hoefnagels, New York, NY (US); Rolf A. Ebeling, Kirkland, WA (US); Nils A. Sundelin, Bothell, WA (US); Bret P. Anderson, Kirkland, WA (US); Matthew I. Worley, Bellevue, WA (US); Gabriel S. DeBacker, Carnation, WA (US); Robert J. Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 389 days.

(21) Appl. No.: 12/969,474

(22) Filed: Dec. 15, 2010

(65) Prior Publication Data
US 2012/0159382 A1 Jun. 21, 2012

(51) Int. Cl.
*G06F 15/00* (2006.01)
*G06F 13/00* (2006.01)

(52) U.S. Cl.
USPC .......................................... 715/803; 715/782

(58) Field of Classification Search
USPC ......... 715/799, 788, 781, 801, 782, 803, 848, 715/779, 856, 764, 721
See application file for complete search history.

(56) References Cited

U.S. PATENT DOCUMENTS

| | | | |
|---|---|---|---|
| 6,212,541 B1 | 4/2001 | McAuliffe et al. | |
| 6,813,768 B1 | 11/2004 | Cragun | |
| 6,831,666 B1 | 12/2004 | Kreis | |
| 6,957,395 B1 | 10/2005 | Jobs et al. | |
| 6,982,682 B1 * | 1/2006 | Kaulgud et al. | 345/1.1 |
| 7,346,855 B2 | 3/2008 | Hellyar et al. | |
| 7,735,018 B2 * | 6/2010 | Bakhash | 715/782 |
| 7,793,232 B2 | 9/2010 | Chaudhri et al. | |
| 2002/0154174 A1 * | 10/2002 | Redlich et al. | 345/848 |
| 2005/0235219 A1 | 10/2005 | Szeto | |
| 2006/0213754 A1 | 9/2006 | Jarrett et al. | |
| 2007/0043839 A1 | 2/2007 | Amadio et al. | |
| 2008/0307351 A1 * | 12/2008 | Louch et al. | 715/782 |
| 2010/0299630 A1 * | 11/2010 | McCutchen et al. | 715/803 |

OTHER PUBLICATIONS

"International Search Report", Mailed Date: Jul. 30, 2012, Application No. PCT/US2011/065161, Filed Date: Dec. 15, 2011, pp. 11.
"Switch through open apps and windows in style using Winflip", Retrieved at << http://www.freewaregenius.com/2008/02/25/switch-through-open-apps-and-windows-in-3d-with-winflip/ >>, Feb. 25, 2008, pp. 6.
"UltimateFavesPRO 1.2—With Task-Killer / Task-Switcher / App-Manager Features", Retrieved at << http://ultimatefaves.wordpress.com/2010/01/12/ultimatefavespro-1-2/ >>, Jan. 12, 2010, pp. 18.

* cited by examiner

*Primary Examiner* — Cao "Kevin" Nguyen
(74) *Attorney, Agent, or Firm* — Sung Kim; Andrew Sanders; Micky Minhas (57) ABSTRACT

This document describes techniques and apparatuses for managing an immersive environment. These techniques and/or apparatuses enable a user to select when, where, or under what conditions to present applications in this immersive environment.

20 Claims, 11 Drawing Sheets

MANAGING AN IMMERSIVE ENVIRONMENT

BACKGROUND

Conventional operating systems permit users to view and interact with multiple computing applications through windows. Each of these windows generally includes a frame having controls for interacting with the computing application as well as controls for selecting which window frame is primary or moving, sizing, or otherwise managing the layout of the window. These window frames, however, occupy portions of a display that might otherwise be dedicated to an application's content. Furthermore, managing the primacy or layout of these windows through these controls can be time-consuming and annoying to users.

Some operating systems permit users to view and interact with a single computing application with little or no window frame, generally by presenting content of an application on all or nearly all of a computer's display. While this technique permits more of an application's content to be viewed, it lacks much of the flexibility permitted by the window-based techniques.

SUMMARY

This document describes techniques and apparatuses for managing an immersive environment. The immersive environment described herein can present multiple applications without dedicating significant amounts of a display to window frames for the applications and/or requiring management of window frames, such as their size, location, or primacy on the display. These techniques and/or apparatuses enable a user to manage one or more applications in this immersive environment.

This summary is provided to introduce simplified concepts for managing an immersive environment that are further described below in the Detailed Description. This summary is not intended to identify essential features of the claimed subject matter, nor is it intended for use in determining the scope of the claimed subject matter. Techniques and/or apparatuses for managing an immersive environment are also referred to herein separately or in conjunction as the "techniques" as permitted by the context.

BRIEF DESCRIPTION OF THE DRAWINGS

Embodiments for managing an immersive environment are described with reference to the following drawings. The same numbers are used throughout the drawings to reference like features and components.

DETAILED DESCRIPTION

Overview

This document describes techniques and apparatuses for managing an immersive environment. These techniques enable a user to select when, where, and/or under what conditions to present applications in this immersive environment.

Assume, for example, that a user wishes to select a music application that he used yesterday while maintaining an immersive presentation of work-related memos that are currently in a primary area of an immersive environment. These techniques can provide a user interface that presents recently-used applications, such as the music application, and enables the user to quickly and easily present the music application in the primary area while automatically moving the work-related memos into a non-primary area of the immersive environment.

Also by way of example, assume that a user wishes to begin his immersive session each day with the same three applications—a sports website, a business-news website, and work-related memos. These techniques permit the user to select these three applications to be automatically presented and maintained in the immersive environment. The user may simply open the immersive environment or logon to his computing device to have these three applications presented in the environment.

These are but two examples of the many ways in which the techniques enable users to manage an immersive environment, others of which are described below.

Example Environment

Figure 1:
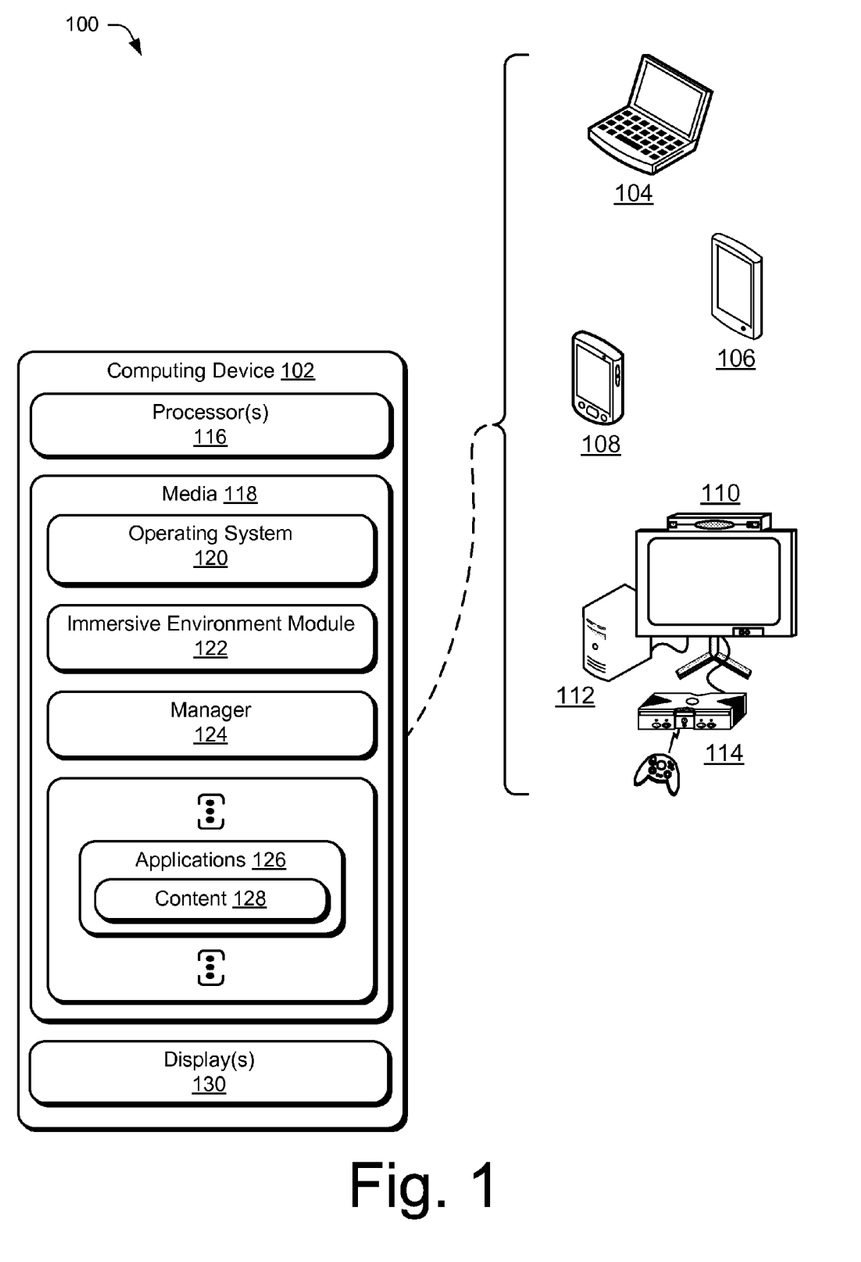
FIG. 1 illustrates an example system in which techniques for managing an immersive environment can be implemented.

FIG. 1 illustrates an example system 100 in which techniques for managing an immersive environment can be embodied. System 100 includes a computing device 102, which is illustrated with six examples: a laptop computer 104, a tablet computer 106, a smart phone 108, a set-top box 110, a desktop computer 112, and a gaming device 114, though other computing devices and systems, such as servers and netbooks, may also be used.

Computing device 102 includes computer processor(s) 116 and computer-readable storage media 118 (media 118). Media 118 includes an operating system 120, immersive environment module 122, manager 124, and applications 126, each of which may provide content 128. Computing device 102 also includes or has access to one or more displays 130, four examples of which are illustrated in FIG. 1.

Immersive environment module 122 provides an environment by which a user may view and interact with one or more of applications 126 and corresponding content 128. In some embodiments, this environment presents content of, and enables interaction with, applications with little or no window frame and/or without a need for a user to manage a window frame's layout or primacy relative to other windows (e.g., which window is active or up front) or manually size or position content. This environment can be, but is not required to be, hosted and/or surfaced without use of a windows-based desktop environment. Thus, in some cases immersive environment module 122 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. While not required, in some cases this immersive environment enables use of all or nearly all of the pixels of a display by applications. Also, few inputs need be used by immersive environment module 122 or manager 124 in many cases, thereby permitting applications to interact with a user with many inputs, such as gestures, hot keys, and the like. Examples of immersive environments are provided below as part of describing the techniques, though they are not exhaustive or intended to limit the techniques.

Manager 124 enables a user to manage an immersive environment and applications 126 presented in the environment. In some embodiments set forth below, immersive environment module 122 presents an immersive environment in which content of applications is presented but where that presentation need not be managed for size, location, or primacy. Manager 124, also in these embodiments, enables management of multiple applications' content size, location, or primacy through a separate user interface. As will be apparent, manager 124 can enable a user to quickly and easily manage content of multiple applications presented in an immersive environment. Manager 124 and/or module 122 can be separate from each other and/or operating system 120, or may be combined or integrated in some form. Thus, in some cases operating system 120 includes immersive environment module 122 and manager 124.

Example Methods

Figure 2:
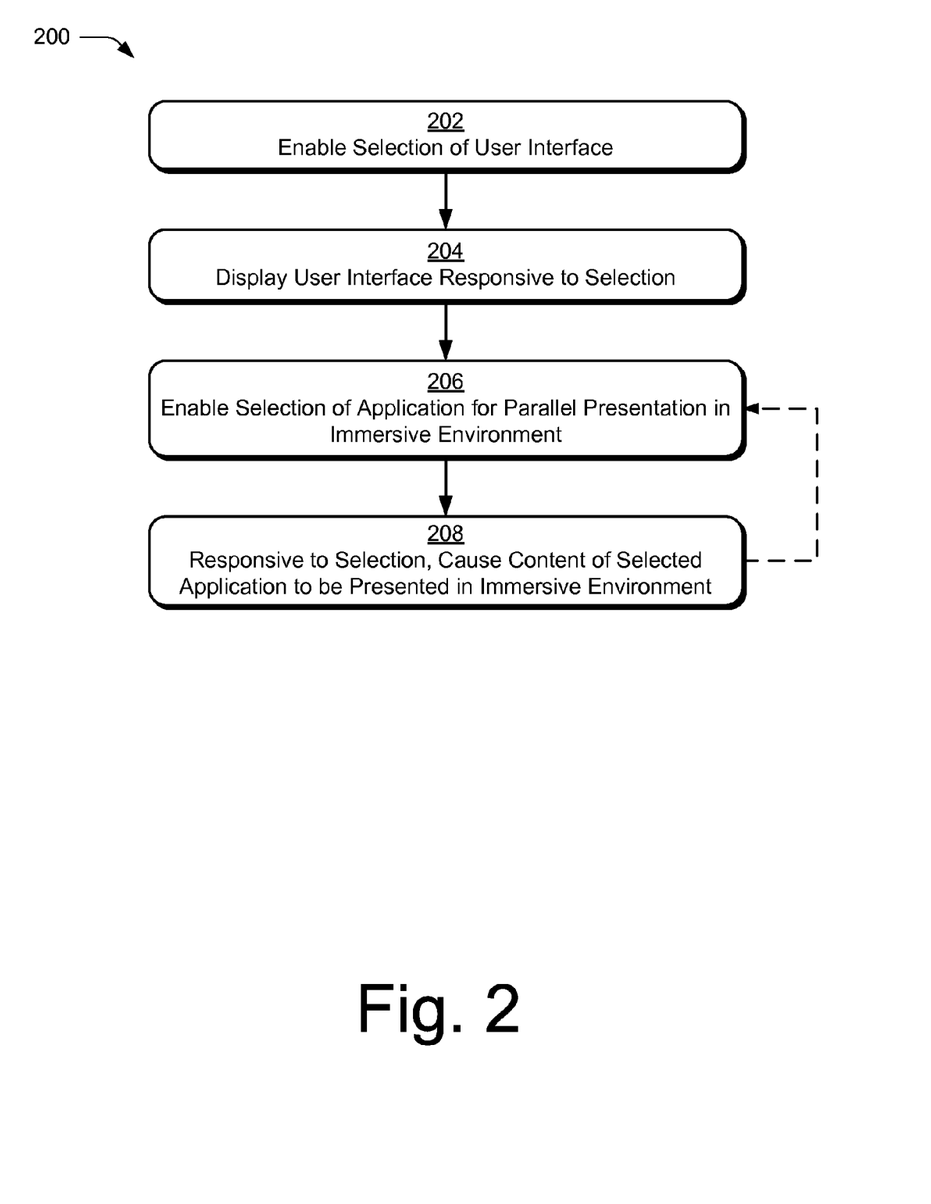
FIG. 2 illustrates an example method for managing an immersive environment.

FIG. 2 depicts a method 200 for managing an immersive environment. In portions of the following discussion reference may be made to system 100 of FIG. 1, reference to which is made for example only.

Figure 3:
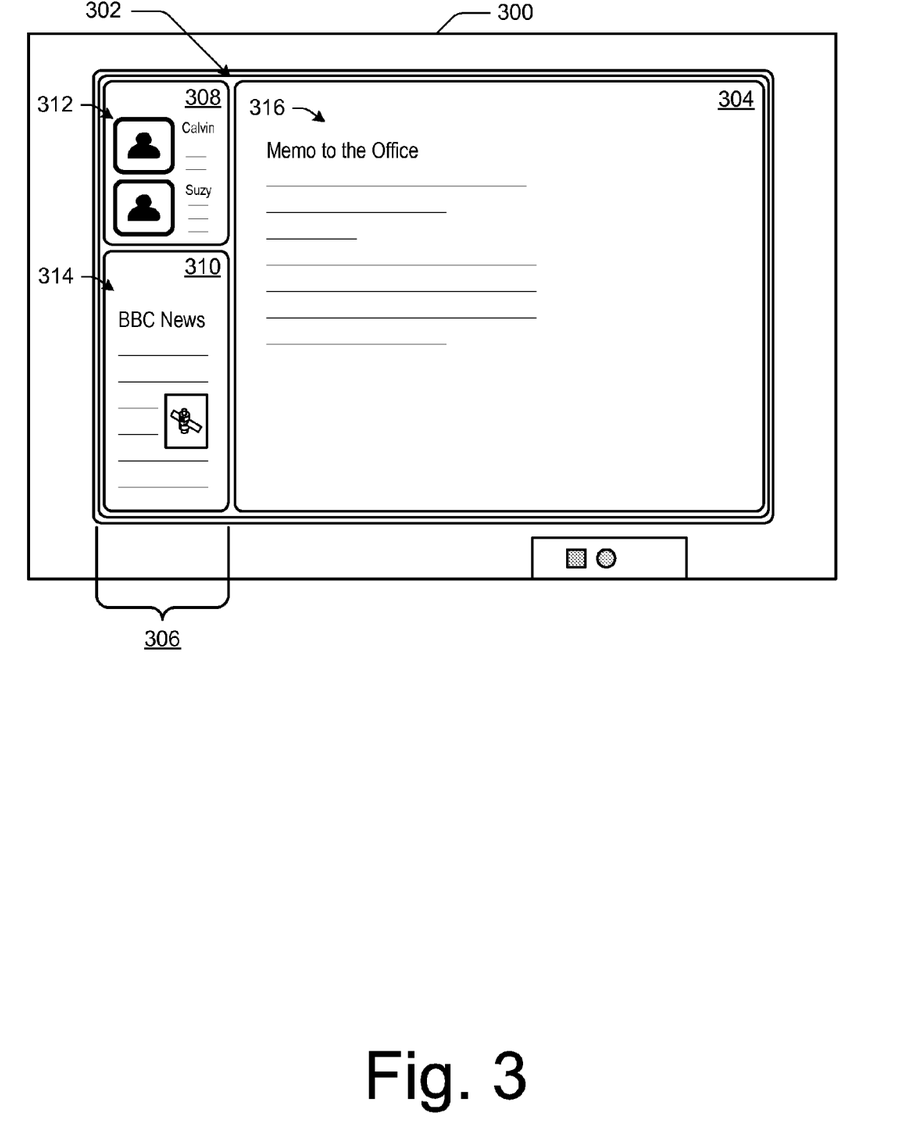
FIG. 3 illustrates an example display having an immersive environment in which a user interface for managing the immersive environment is not yet displayed.

Block 202 enables selection of a user interface for managing an immersive environment. Prior to selection, the user interface can be fully displayed, partially displayed, or not at all displayed. Consider, for example, a scenario where an immersive environment is displayed and the user interface is not displayed. An example of such a scenario is illustrated in FIG. 3, which shows display 300 filled with immersive environment 302. Immersive environment 302 includes a primary region 304 and a non-primary region 306, both of which present various content 128 of applications 126. Note that non-primary region 306 includes two non-primary sections 308 and 310, each of which may be used to present content in parallel with each other and that of primary region 304. In this example, content from three applications is presented in parallel: content 312 from a social networking website, content 314 from a news website, and content 316 from a local document-viewing application.

Here manager 124 of FIG. 1 enables selection of the user interface with a non-visual selector, such as a hot key or selector movement (e.g., a mouse selector moved to a right edge of primary region 304) or, in the case of a touch screen, a gesture. In some other cases, however, manager 124 enables selection through a displayed, selectable control.

Block 204 displays the user interface responsive to this selection. This user interface can be arranged and displayed in various manners, examples of which are described below. Through this user interface, block 206 enables selection of an application for parallel presentation in the immersive environment.

This user interface enables a user to manage the immersive environment, though it may enable this in various manners. The user interface, for example, may enable a user to present, remove, or set as default an application to the user interface and/or the environment, such as through selection of labels associated with, or representations of, the applications. The user interface may enable a user to select preferences for applications to be presented in the user interface, alter the environment generally, or switch to a non-immersive environment. Furthermore, the user interface may present applications for selection based on various criteria, such as those applications that are most-recently used or most-often used by a user of computing device 102, as well as whether or not the application is currently executing.

Continuing the ongoing example, assume that manager 124 receives, through a gesture made on a touch screen of display 300, a selection to present the user interface. In response, manager 124 presents user interface 400 illustrated in FIG. 4, through which selection of applications is enabled. This example user interface 400 presents selectable labels (here thumbnails of content associated with each application and/or an icon or name for the application) for each of nine applications. The nine applications include various websites, services, and local computing applications, and are named "Social Net," "News.com," "PDFs," "Telecon," "Music.com," "Movies.com," "Poker.com," "Art Space,", and "Maps by GPS" at 402, 404, 406, 408, 410, 412, 414, 416, and 418, respectively.

Figure 4:
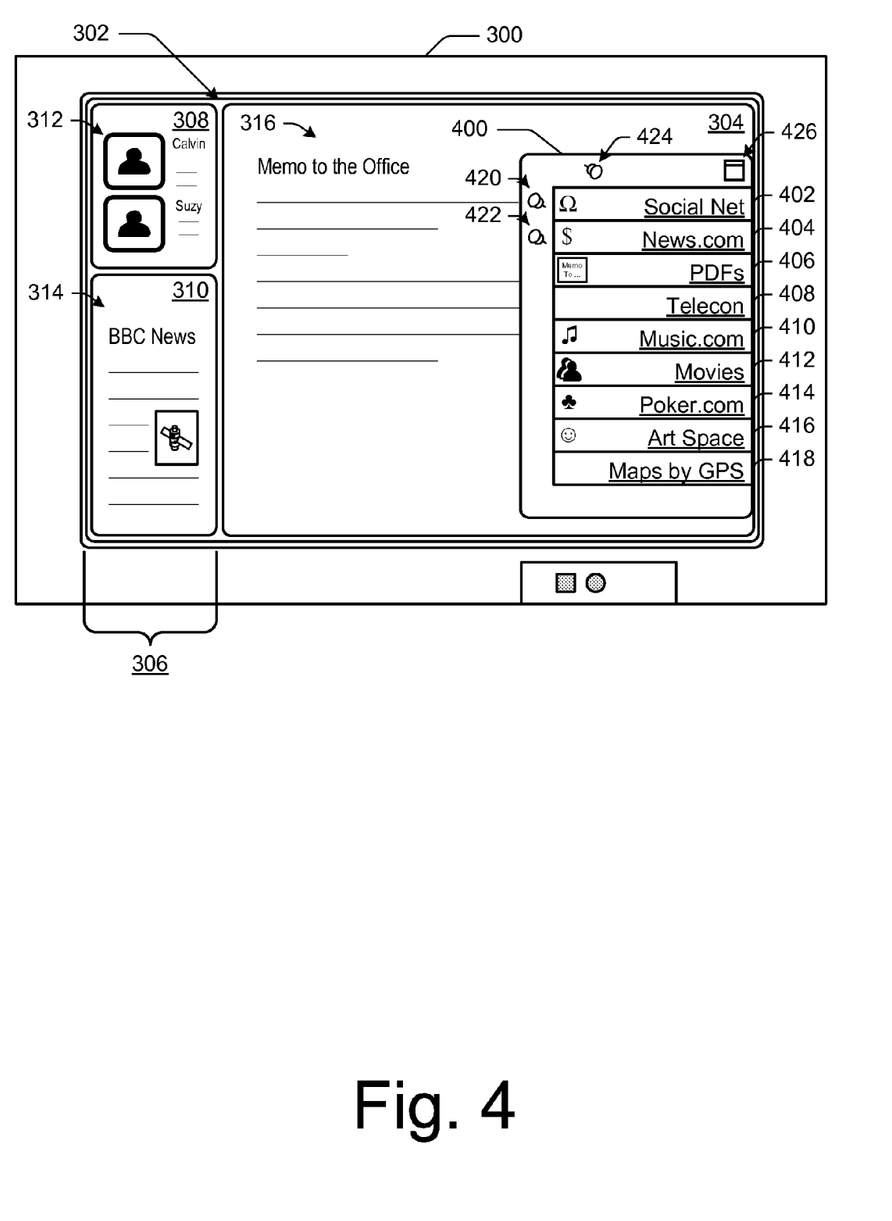
FIG. 4 illustrates the example immersive environment of FIG. 3 and also an example user interface for managing the immersive environment.

In this particular example, two applications, 402 and 404, are "pinned." Pin icons, shown at 420 and 422, indicate that applications 402 and 404 will be maintained in one or both of immersive environment 302 and in user interface 400 (here it indicates both). Thus, both the "Social Net" and "News.com" applications will be executing and presenting content within some part of environment 302 without further selection by the user (shown in sections 308 and 310, respectively). Note that selection of maintained ("pinned") applications can be enabled by manager 124 in various ways, such as through user interface 400 presenting pinning selection icon 424 for selection of any of applications 406-418. As noted, any of the selectable applications may or may not be currently executing—in this case applications 402, 404, 406, and 408 are executing and applications 410-418 are not currently executing.

User interface 400 may also present applications based on other criteria, such as a user's history. Applications 406, 408, 410, and 412, for example, are presented based on being the four most-recently-used by a user of computing device 102 (other than 402 and 404). Applications 414, 416, and 418 are presented based on being most-often-used, excluding applications 402-412.

Further still, user interface 400 enables a user to manage immersive environment 302 in addition to management of applications, such as with window selection icon 426. Through this selection, manager 124 permits a user to select to exit immersive environment 302 and continue with currently-presented content using a windows environment.

Returning to method 200, block 208, responsive to selection of one or more applications, causes content of a selected application to be presented in the immersive environment in parallel with presentation of content of a different application.

Figure 5:
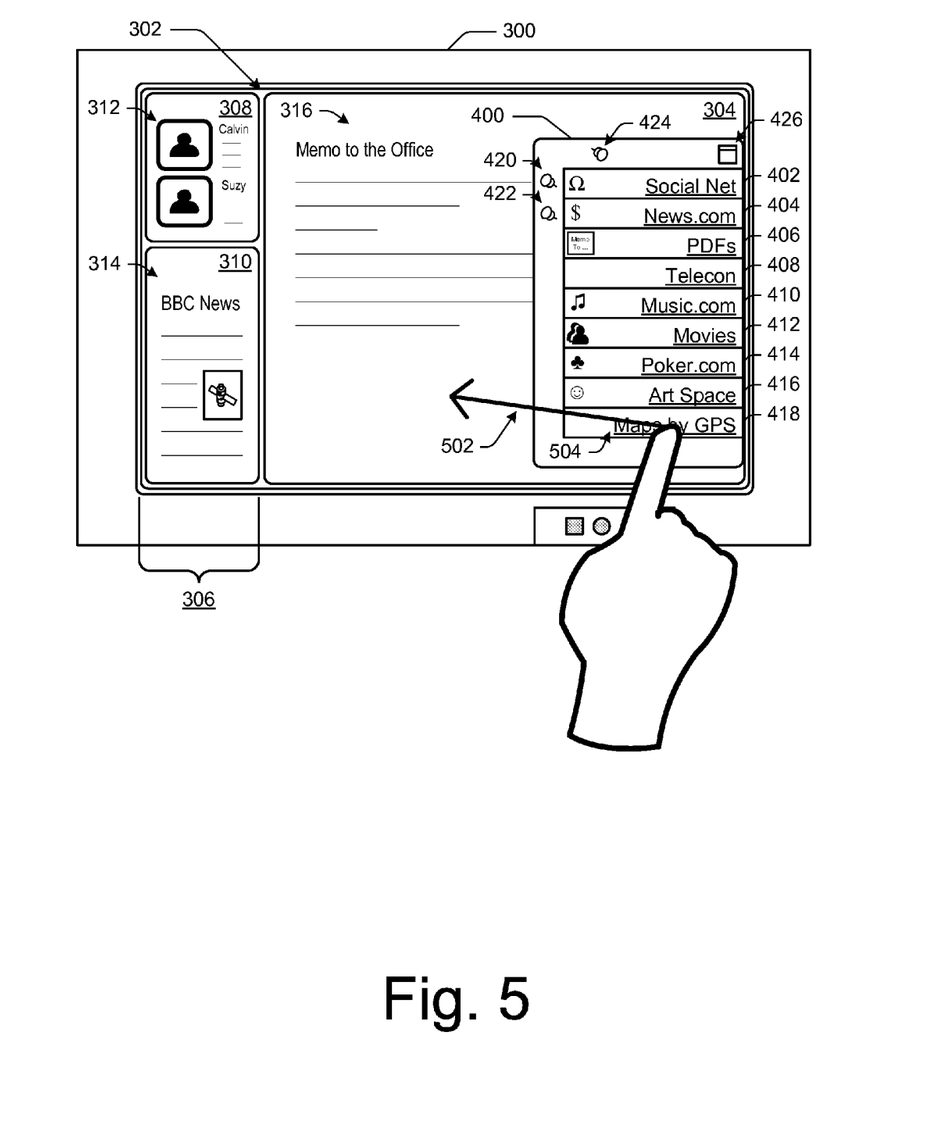
FIG. 5 illustrates the example immersive environment and user interface of FIG. 4 also with an example selection of an application.

Continuing the ongoing example of FIGS. 3 and 4, assume that a user selects application 418 ("Maps by GPS"). FIG. 5 illustrates one way in which this selection can be received, here a drag-and-drop 502 of label 504 from user interface 400 to primary region 304.

Figure 6:
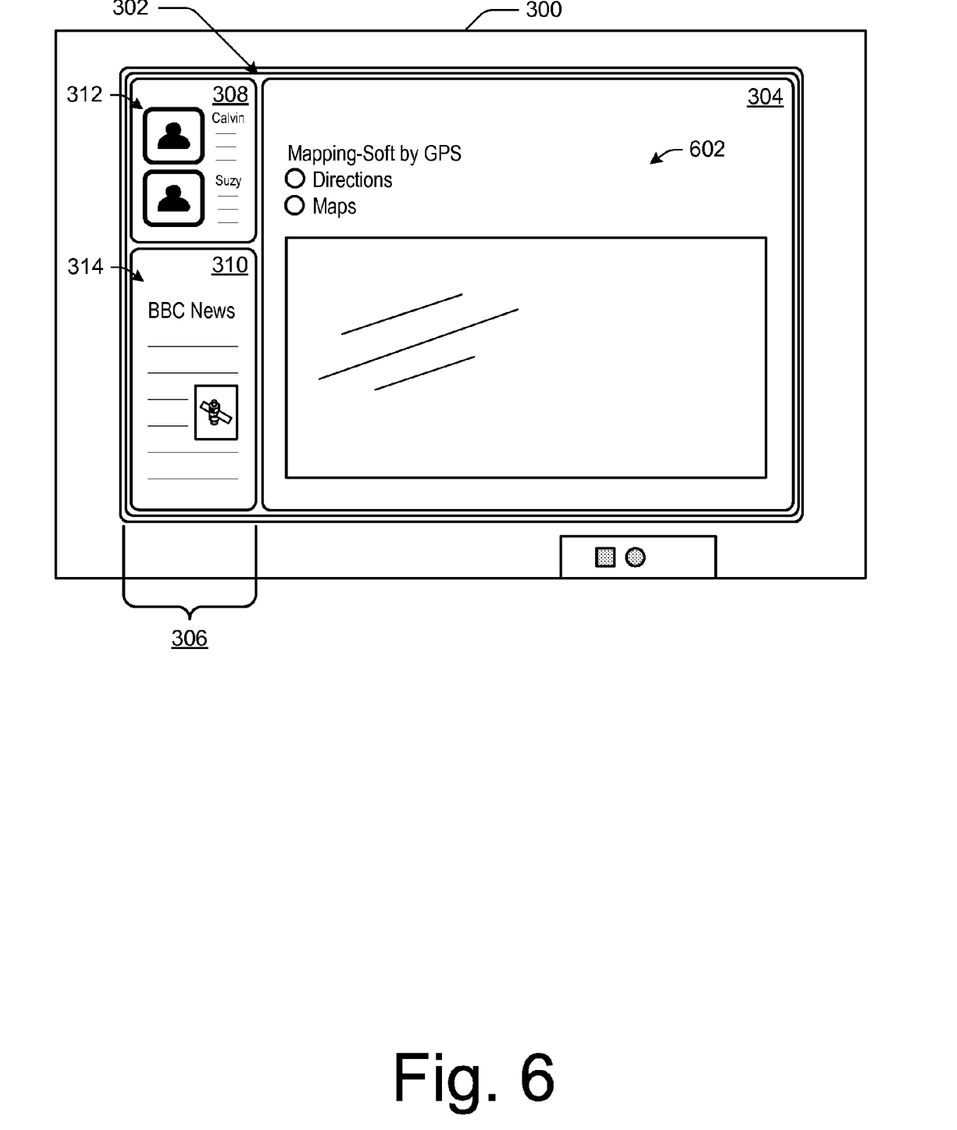
FIG. 6 illustrates example content of the selected application of FIG. 5 show in the example immersive environment of FIGS. 3-5.

Manager 124 responds to this drag-and-drop selection by presenting content of application 418 in primary region 304 in parallel with content shown in non-primary region 306. This new content is shown in FIG. 6 at 602. As application 418 was not executing, manager 124 first executes application 418 to receive the content.

Note that content 316 ("Memo to Office") is removed from immersive environment 302, though it could instead be moved into non-primary region 306. If moved into non-primary region 306, content from another application currently in region 306 can be removed or an additional section can be added, in which content 316 is presented. If applications in non-primary region 306 are pinned, however, which is the case in FIG. 5, they are not removed. Here the memorandum shown in part at content 316 in FIGS. 3 and 4 is removed and replaced with content 602, which concludes the example illustrated in FIGS. 3-6.

Manager 124 also enables selection of an application to present in non-primary region 306. Assume, for example, that the user dragged and dropped label 504 of FIG. 5 to region 306 instead of 304. In such a case, content 316 stays in primary region 304, while content for application 418 is instead moved into non-primary region 306. As the two applications in region 306 are pinned, a new section of non-primary region 306 is created by manager 124 or immersive environment module 122, into which content from application 418 would be placed (not shown).

Returning to method 200, note that method 200 may receive multiple selections. In response to these multiple selections, block 208 causes content of each selected application to be presented in the immersive environment. In such a case, manager 124 may serially present content from each of the selected applications or at once. In one serial case, consider the above example but assume that application 406 was selected at a prior iteration of block 206 and, responsive to this selection, manager 124 presented content 316 of application 406 (as shown in FIGS. 3 and 4). Following this selection of application 406, later iterations of blocks 206 and 208 are performed, such as following the example selection of application 418 noted above. Serial presentation of applications is enabled by manager 124 at least through additional iterations of block 206 and 208, shown as potentially repeating with a dashed line from block 208 to block 206.

Manager 124 may update which application it presents in a user interface, such as by removing one of applications 402-418 and replacing it with a different application. This may be done responsive to user selection or automatically based on various criteria noted above.

Figure 7:
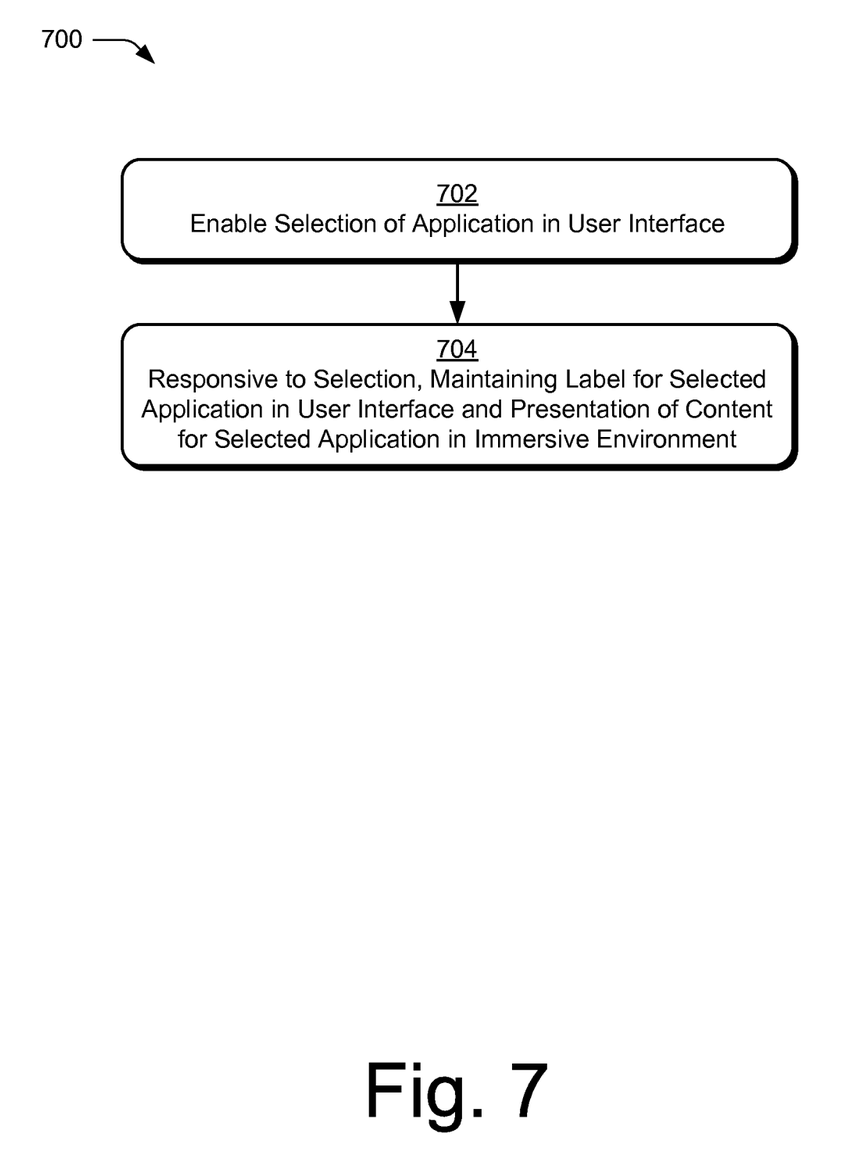
FIG. 7 illustrates an example method for maintaining applications in a user interface for managing an immersive environment.

FIG. 7 depicts a method 700 for maintaining applications in a user interface. In portions of the following discussion reference may be made to system 100 of FIG. 1, reference to which is made for example only.

Block 702 enables selection of an application in a user interface through which an immersive environment is capable of being managed. This selection can be through the user interface in which it is to be maintained or otherwise, such as with a hot key or separate user interface.

Figure 8:
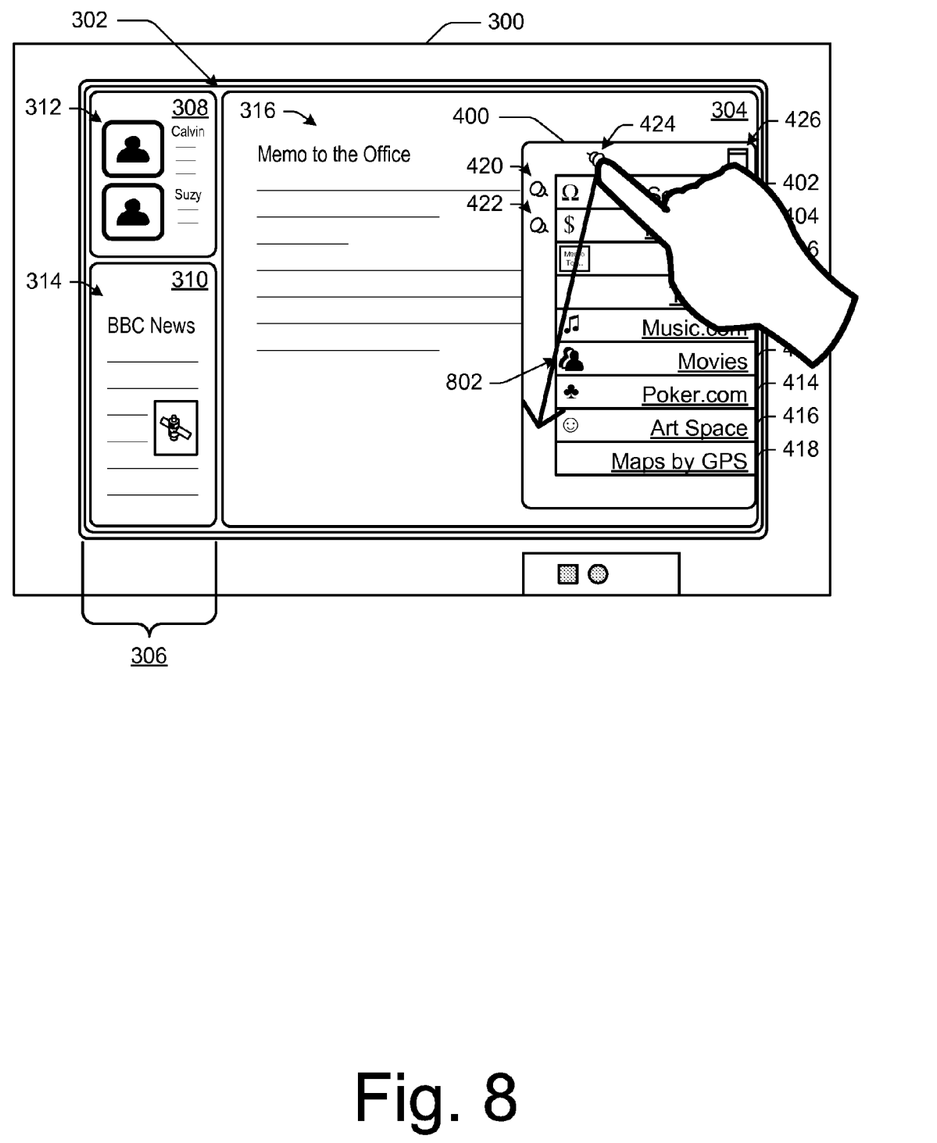
FIG. 8 illustrates the example immersive environment and user interface of FIG. 5 also with an example selection to maintain an application in the user interface.

Consider, for example, a case where manager 124 enables a user to select to maintain this application through the same interface that enables management of an immersive environment. Such an example is illustrated in FIG. 8, which shows, on display 300, a user selection by drag-and-drop 802 of pinning selection icon 424 to application 416 (a local drawing application labeled "Art Space") from within user interface 400.

Block 704, responsive to selection, maintains a label for the selected application in the user interface and maintains presentation of content of the selected application in the immersive environment. This maintaining of the selected application may or may not alter a current look of the user interface, though it will prevent the application from being removed from the interface without an explicit user selection.

Figure 9:
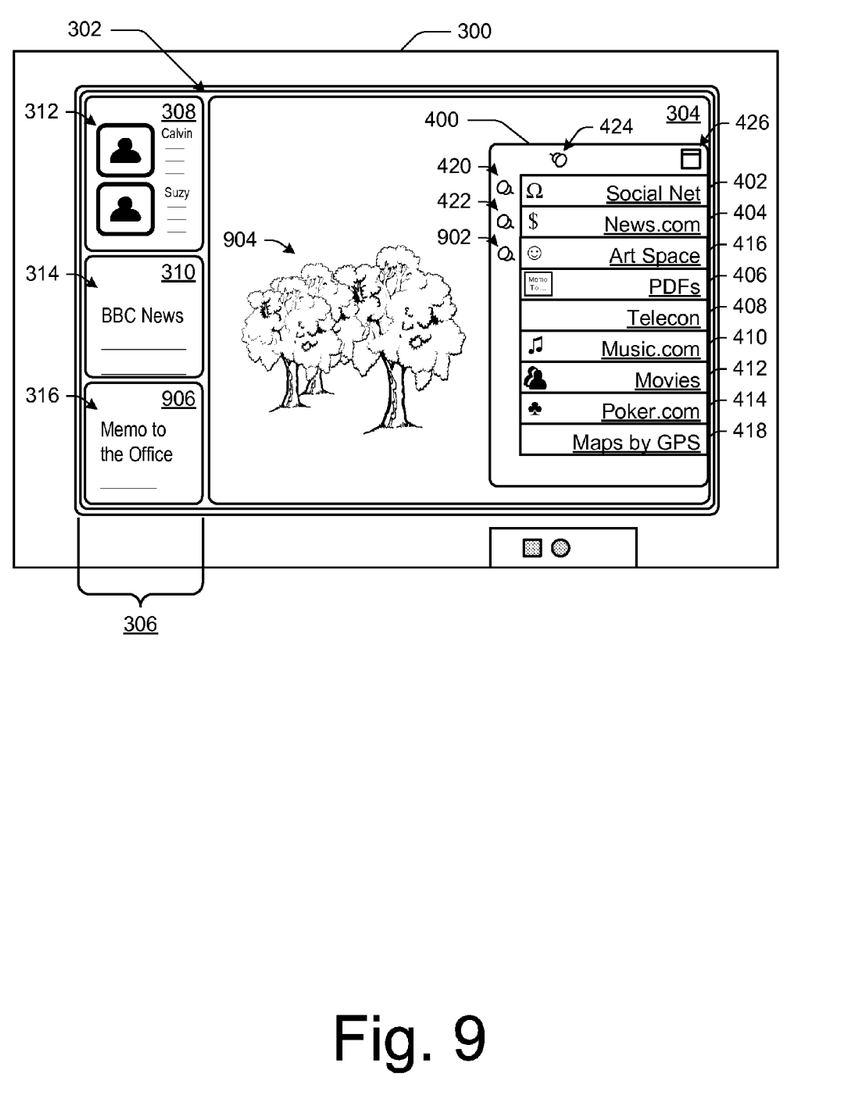
FIG. 9 illustrates the example immersive environment and user interface of FIG. 8 along with the selected application being maintained in both the user interface and the immersive environment.

Continuing the ongoing example, consider FIG. 9, which illustrates a change to user interface 400 to show that the selected application (application 416) is now maintained (e.g., "pinned"). This is indicated with pin icon 902 in FIG. 9. Note also that application 416 has now moved up higher in the list of applications shown in user interface 400.

FIG. 9 also illustrates an example way in which block 704 may present content of a selected application, here a last-used drawing of application 416. If the selected application is not already presented in the immersive environment, as is the case in this example, manager 124 presents that content and then acts to maintain it as long as the immersive environment is being used. Manager 124 may also automatically present content of this and other pinned applications on login or beginning an immersive environment session.

In this example manager 124 presents content 904 of application 416 in primary region 304 and moves content 316 of application 406 to non-primary region 306. To do so, manager 124 alters immersive environment 302 by creating a new section 906 and reducing section 310.

Figure 10:
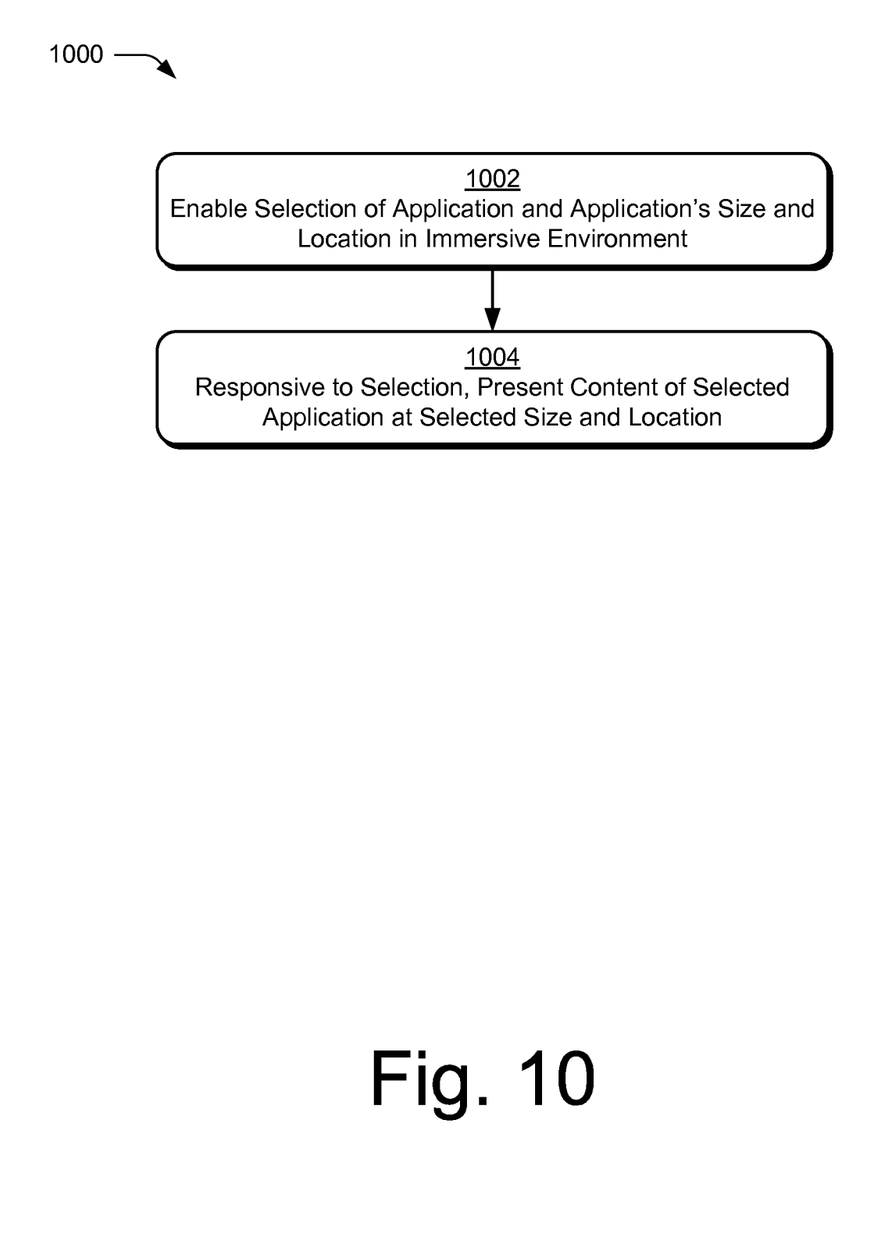
FIG. 10 illustrates an example method for enabling selection of an application for presentation in an immersive environment at a size and location in the immersive environment.

FIG. 10 depicts a method 1000 for enabling selection of an application for presentation in an immersive environment at a size and location in the immersive environment. While not required, this selection can be enabled through a single selection and through a single user interface. In portions of the following discussion reference may be made to system 100 of FIG. 1, reference to which is made for example only.

Block 1002 enables selection of an application for presentation in an immersive environment, as well as the application's size and location in the immersive environment. Block 1002 can enable selection through a single user interface, and in some case, with as little as one selection. Note that block 1002 can enable selection of the application from multiple applications, and a size or location from multiple sizes and locations within the immersive environment. Block 1002 may also or instead enable selection to change an application's size and location that is already presented, such as with manager 124 enabling a drag-and-drop of a representation of one application from an area in which it is presented to another area (e.g., a gesture starting in primary region 304 and ending in non-primary region 306).

Whether enabling a change to a presentation or a new presentation for an application in an immersive environment, block 1002 may do so with as little as a single selection. By way of example, consider FIG. 5, which shows primary region 304 and sections 308 and 310 of non-primary region 306. Each of these three includes an area in which content of an application can be presented. Each of these three is also of a different size and at a different location in immersive environment 302. In this example, the single selection is with a single drag-and-drop of a selectable label of the nine shown in user interface 400 to any of these three areas. As is clear from these examples, manager 124 enables selection of a size, location, and/or presentation of one of multiple applications with as few as one selection.

Block 1004, responsive to selection, causes content of the selected application to be displayed in an immersive environment at the selected size and at the selected location. This is illustrated in FIG. 6, which shows content 602 of application 418 at the size and location of primary region 304.

The preceding discussion describes methods in which the techniques may operate to manage an immersive environment. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor, such as software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

Example Device

Figure 11:
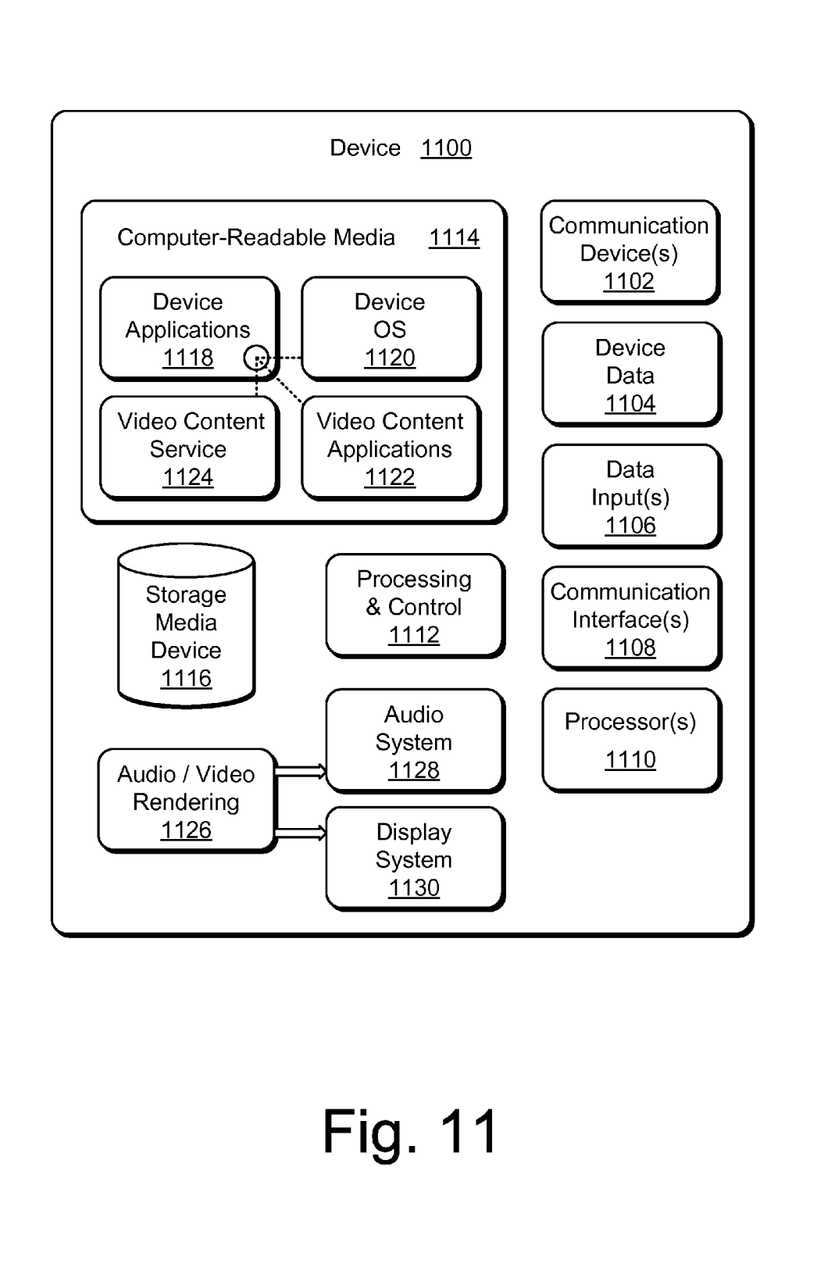
FIG. 11 illustrates an example device in which techniques for managing an immersive environment can be implemented.

FIG. 11 illustrates various components of an example device 1100 that can be implemented as any type of client, server, and/or computing device as described with reference to the previous FIGS. 1-10 to implement techniques for managing an immersive environment. In embodiments, device 1100 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1100 may also be associated with a user (e.g., a person) and/or an entity that operates the device such that a device describes logical devices that include users, software, firmware, and/or a combination of devices.

Device 1100 includes communication devices 1102 that enable wired and/or wireless communication of device data 1104 (e.g., received data, data that is being received, data scheduled for broadcast, data packets of the data, etc.). Device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108, which can be implemented as any one or more of a serial and/or parallel interface, a wireless interface, any type of network interface, a modem, and as any other type of communication interface. Communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like), which process various computer-executable instructions to control the operation of device 1100 and to implement embodiments for managing an immersive environment. Alternatively or in addition, device 1100 can be implemented with any one or combination of hardware, firmware, or fixed logic circuitry that is implemented in connection with processing and control circuits that are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable storage media 1114, such as one or more memory devices that enable persistent and/or non-transitory data storage (in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable storage media 1114 provides data storage mechanisms to store device data 1104, as well as various device applications 1118 and any other types of information and/or data related to operational aspects of device 1100. For example, device operating system 1120 can be maintained as a computer application with computer-readable storage media 1114 and executed on processors 1110. Device applications 1118 may include a device manager, such as any form of a control application, software application, signal-processing and control module, code that is native to a particular device, a hardware abstraction layer for a particular device, and so on.

Device applications 1118 also include any system components or modules to implement techniques for managing an immersive environment. In this example, device applications 1118 can include video content applications 1122, such as when device 1100 is implemented as a client device. Alternatively or in addition, device applications 1118 can include a video content service 1124, such as when device 1100 is implemented as a media content service. Video content applications 1122 and video content service 1124 are shown as software modules and/or computer applications. Alternatively or in addition, video content applications 1122 and/or video content service 1124 can be implemented as hardware, software, firmware, or any combination thereof.

Device 1100 also includes an audio and/or video rendering system 1126 that generates and provides audio data to an audio system 1128 and/or generates and provides display data to a display system 1130. Audio system 1128 and/or display system 1130 can include any devices that process, display, and/or otherwise render audio, display, and image data. Display data and audio signals can be communicated from device 1100 to an audio device and/or to a display device via an RF (radio frequency) link, S-video link, composite video link, component video link, DVI (digital video interface), analog audio connection, or other similar communication link. In an embodiment, audio system 1128 and/or display system 1130 are implemented as external components to device 1100.

Alternatively, audio system 1128 and/or display system 1130 are implemented as integrated components of device 1100.

Techniques for managing an immersive environment, of which the above-described methods are examples, may be embodied on one or more of the entities shown in system 100 of FIG. 1 and/or example device 1100 described above, which may be further divided, combined, and so on. Thus, system 100 and/or device 1100 illustrate some of many possible systems or apparatuses capable of employing the described techniques. The entities of system 100 and/or device 1100 generally represent software, firmware, hardware, whole devices or networks, or a combination thereof. In the case of a software implementation, for instance, the entities (e.g., manager 124 of FIG. 1) represent program code that performs specified tasks when executed on a processor (e.g., processor(s) 116 of FIG. 1). The program code can be stored in one or more computer-readable memory devices, such as computer-readable storage media 118 or computer-readable media 1114. The features and techniques described herein are platform-independent, meaning that they may be implemented on a variety of commercial computing platforms having a variety of processors.

CONCLUSION

Although embodiments of techniques and apparatuses for managing an immersive environment have been described in language specific to features and/or methods, it is to be understood that the subject of the appended claims is not necessarily limited to the specific features or methods described. Rather, the specific features and methods are disclosed as example implementations for managing an immersive environment.

What is claimed is:

1. A computer-implemented method comprising:
enabling, through a user interface, selection of an application for parallel presentation in an immersive environment on one or more displays associated with a computing device;
responsive to selection, causing content of the selected application to be presented in the immersive environment and in parallel with presentation of content of a different application also presented in the immersive environment, the immersive environment having little or no window frame and enabling interaction with the selected application and the different application.

2. A computer-implemented method as described in claim 1, further comprising enabling selection of the user interface and displaying the user interface responsive to selection of the user interface and prior to enabling selection of an application.

3. A computer-implemented method as described in claim 2, wherein enabling selection of the user interface includes enabling selection with a non-visual selector.

4. A computer-implemented method as described in claim 1, wherein enabling selection of an application enables selection of multiple different applications and wherein enabling selection of multiple different applications is based on the multiple different applications being recently used, often used, or having been selected to be maintained in the user interface.

5. A computer-implemented method as described in claim 1, wherein enabling selection of an application enables selection of multiple different applications and wherein enabling selection of multiple different applications includes displaying selectable labels for each of the multiple different applications.

6. A computer-implemented method as described in claim 1, wherein enabling selection of an application enables selection of multiple different applications and further comprising automatically removing, from the user interface, one or more of the multiple different applications responsive to one or more of the multiple different applications not recently being used.

7. A computer-implemented method as described in claim 1, wherein enabling selection of an application enables selection of multiple different applications and further comprising automatically removing one or more of the multiple different applications responsive to one or more of the multiple different applications not often being used.

8. A computer-implemented method as described in claim 1, further comprising, prior to causing content of the selected application to be presented, presenting the content of the different application in the immersive environment without user selection or interaction.

9. A computer-implemented method as described in claim 8, wherein presenting the content of the different application without user selection or interaction is based on the different application being set as a maintained application.

10. A computing device comprising: one or more processors; and
one or more computer-readable storage media having instructions stored thereon that, responsive to execution by the one or more processors, perform operations comprising:
enabling selection of an application in a user interface through which an immersive environment is managed, the immersive environment having little or no window frame and enabling interaction with the selected application and at least one other application; and
responsive to selection, maintaining a label for the selected application in the user interface and maintaining presentation of content of the selected application in the immersive environment.

11. A computing device as described in claim 10, wherein the presentation of the content of the selected application is in parallel with content of the at least one other application.

12. A computing device as described in claim 10, wherein the user interface enables selection to present content of a different application and, further comprising, responsive to selection of the different application, presenting content of the selected different application in a region in which the content of the selected application is presented and moving the content of the selected application to a new region of the immersive environment.

13. A computing device as described in claim 10, further comprising executing the selected application.

14. A computer-implemented method comprising:
under control of one or more processors configured with executable instructions:
enabling, through a single user interface, selection of:
an application;
a size in which to present content of the application; and
a location at which to present the content of the application, and responsive to selection, causing the content of the selected application to be presented in an immersive environment at the selected size and at the selected location, the immersive environment having little or no window frame and enabling interaction with the selected application and at least one other application.

15. A computer-implemented method as described in claim 14, wherein the selection of the application, the size of the content, and the location of the content includes only a single selection.

16. A computer-implemented method as described in claim 15, wherein the single selection is a drag-and-drop of: a label associated with the application from the single user interface to an area of a display having the size and the location; or a representation of the application from a different area of the display to said area of the display having the size and location.

17. A computer-implemented method as described in claim 14, wherein causing content of the selected application to be presented in the immersive environment presents the content in parallel with presentation of other content of the at least one other application in the immersive environment.

18. A computer-implemented method as described in claim 1, wherein the immersive environment presents the content of the selected application in a first region and presents the content of the different application in a second region, the first region and the second region being determined, based on the selection.

19. A computer-implemented method as described in claim 1, further comprising moving the different application to another portion of the immersive environment responsive to the selected application being presented in the immersive environment.

20. A computer-implemented method as described in claim 19, wherein moving the different application to another portion of the immersive environment is based on a selection via the user interface to maintain the different application.

* * * * *